United States Patent
Bachmann

(10) Patent No.: US 10,507,724 B2
(45) Date of Patent: Dec. 17, 2019

(54) FILLING NECK

(71) Applicant: ILLINOIS TOOL WORKS INC., Glenview, IL (US)

(72) Inventor: Manuel Bachmann, Uettingen (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 107 days.

(21) Appl. No.: 15/573,178

(22) PCT Filed: Apr. 25, 2016

(86) PCT No.: PCT/US2016/029208
§ 371 (c)(1),
(2) Date: Nov. 10, 2017

(87) PCT Pub. No.: WO2016/186800
PCT Pub. Date: Nov. 24, 2016

(65) Prior Publication Data
US 2018/0126843 A1 May 10, 2018

(30) Foreign Application Priority Data
May 15, 2015 (DE) .......................... 10 2015 107 681

(51) Int. Cl.
*B60K 15/04* (2006.01)

(52) U.S. Cl.
CPC ...... *B60K 15/04* (2013.01); *B60K 2015/0483* (2013.01)

(58) Field of Classification Search
CPC ............ B60K 15/04; B60K 2015/0483; B60K 2015/0429; B60K 2015/0461; B60K 15/0409
See application file for complete search history.

(56) References Cited

U.S. PATENT DOCUMENTS

| | | | | |
|---|---|---|---|---|
| 7,302,977 B2* | 12/2007 | King | ...................... | B60K 15/04 141/302 |
| 2011/0315682 A1* | 12/2011 | Tsiberidis | .............. | B60K 15/04 220/86.2 |

FOREIGN PATENT DOCUMENTS

| | | |
|---|---|---|
| DE | 102004002994 | 9/2005 |
| DE | 102008009252 | 8/2009 |

(Continued)

OTHER PUBLICATIONS

PCT, International Search Report and Written Opinion, International Application No. PCT/US2016/029208; dated Jul. 18, 2016, 10 pages.

*Primary Examiner* — Timothy P. Kelly
(74) *Attorney, Agent, or Firm* — Thompson Hine LLP

(57) ABSTRACT

A fuel filling neck includes a closure flap pivotably mounted thereon to be pivoted between a neck closed position and a neck open position. The flap is preloaded into the closed position by spring pretension. A mis-filling prevention device is in the filling neck between the closure flap and an insertion opening for a fuel pump nozzle and has a closed position that prevents the closure flap from being pivoted into the open position, and an enabling position permitting the closure flap to be pivoted into the open position. The mis-filling prevention device is mounted with axial play so as to be first axially forced against the closure flap by the fuel pump nozzle as the nozzle is inserted, the closure flap being moved into a partly open position, and, during subsequent further insertion of the nozzle, the mis-filling prevention device being moved into the enabling position.

16 Claims, 11 Drawing Sheets

(56) References Cited

FOREIGN PATENT DOCUMENTS

Figure 1:
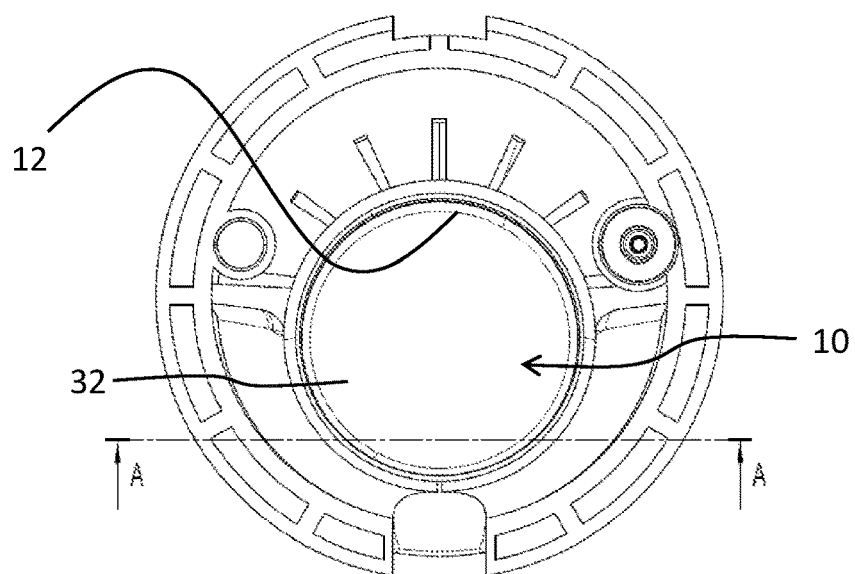

EP          1262355      12/2002
WO    WO 2011/074593     6/2011

* cited by examiner

FILLING NECK

The invention relates to a filling neck for putting fuel into a vehicle tank, comprising a closure flap which is mounted on the filling neck such that it can be pivoted between a closed position closing the filling neck and an open position opening the filling neck, and which is preloaded into the closed position by spring pretension and can be pivoted from the closed position into the open position by a fuel pump nozzle, and comprising a mis-filling prevention device which is arranged in the filling neck between the closure flap and an insertion opening for the fuel pump nozzle and which, in a closed position, prevents the closure flap from being pivoted into the open position by the fuel pump nozzle, and can be moved by the fuel pump nozzle from its closed position into an enabling position permitting the closure flap to be pivoted into the open position by the fuel pump nozzle.

Diesel pump nozzles generally have a larger diameter than gasoline pump nozzles. It is therefore possible, by virtue of a sufficiently small diameter of the filling pipe formed by the filling neck, to avoid insertion of a diesel pump nozzle into a filling neck for a gasoline tank and therefore mis-filling. Mis-filling of a diesel vehicle tank with gasoline can, however, not be prevented in this way. For this purpose, mis-filling prevention devices (mis-fuel inhibitor MFI) are known. For example, DE 10 2004 002 994 B3 proposes a mis-filling prevention device comprising an activation ring which can be spread apart and whose narrow cross section is smaller in the non-spread-open state than the diameter of a diesel pump nozzle, but larger than or equal in size to the gasoline pump nozzle. As a result, the activation ring can be spread apart only by means of a diesel pump nozzle. A closure flap which closes the filling neck is only opened in the spread-open state, with the result that in order to fill the vehicle tank said closure flap can be moved into an open position. Through suitable dimensioning of the activation ring which can be spread apart, such mis-filling prevention devices can also be used in gasoline vehicle tanks. Mis-filling and theft of fuel can then be prevented.

As a rule, the closure flap closes off the filling neck in the closed position in a seal-forming fashion, in order, for example, to prevent the fuel vapors from escaping. This function is important, in particular, in the case of capless filling necks in which an external cap which closes the filling neck is not provided on the filling neck. However, fuel frequently already escapes from fuel pump nozzles even just before the actual filling process. Also, after the end of the filling process there is also frequently subsequent running of small quantities of fuel. Such fuel which is running in advance or running subsequently can collect in an undesired way in the filling neck owing to the closure flaps which close the filling neck in a sealed fashion.

On the basis of the explained prior art, the invention is based on the object of making available a filling neck of the type specified at the beginning which prevents mis-filling, avoids fuel vapors escaping, and with which fuel which runs in advance or runs subsequently does not collect in the filling neck.

The invention achieves the object by means of the subject matter of claim 1. Advantageous refinements can be found in the dependent claims, the description and the figures.

For a filling neck of the type specified at the beginning, the invention achieves the object in that
the mis-filling prevention device is mounted in the filling neck with axial play in such a way that the mis-filling prevention device is first forced against the closure flap in the axial direction by the fuel pump nozzle as the latter is inserted into the filling neck, the closure flap being moved into a partly open position, and, during subsequent further insertion of the fuel pump nozzle, the mis-filling prevention device being moved into the enabling position by the fuel pump nozzle.

The filling neck according to the invention can be a capless filling neck or a filling neck with a cap. The filling neck forms a tubular section with an insertion opening for inserting a fuel pump nozzle, in the present case in particular a diesel pump nozzle or a gasoline pump nozzle. In the installed state of the filling neck, the tubular section is connected to the vehicle tank, in particular by means of a filling pipe. In the filling neck there is a closure flap which is mounted such that it can be pivoted between a closed position and an open position. In the closed position, the closure flap closes off the filling neck from the tank, in particular in a seal-forming fashion. For this purpose, a suitable seal may be provided. A mis-filling prevention device is arranged between the insertion opening for the fuel pump nozzle and the closure flap. In its closed position, the mis-filling prevention device blocks opening of the closure flap. In order to open the closure flap, the mis-filling prevention device must firstly be actuated into its enabling position by a suitable fuel pump nozzle. In the present example, actuation of the mis-filling prevention device into its enabling position can be made possible, in particular, by a diesel pump nozzle, but not by a spark ignition pump nozzle which has a smaller cross section. Through suitable dimensioning, the mis-filling prevention device can, however, be used even in gasoline vehicle tanks. Mis-filling and theft of fuel can then be prevented. If the mis-filling prevention device is in its enabling position, the closure flap can be pivoted into its open position, and fuel can be filled into the vehicle tank by means of the fuel pump nozzle.

According to the invention, the mis-filling prevention device is mounted in the filling neck with axial play in the insertion direction of the fuel pump nozzle. In this context, the necessary force for an axial movement of the mis-filling prevention device is smaller than the necessary force for actuating the mis-filling prevention device into its enabling position. Therefore, when the fuel pump nozzle is inserted, the mis-filling prevention device is firstly moved axially against the closure flap and the closure flap is as a result slightly opened. Only subsequently, in particular after the axial travel movement of the mis-filling prevention device is ended, for example as a result of a stop being reached, is the mis-filling prevention device moved into its enabling position through further forcing in of the fuel pump nozzle, and the closure flap completely opened in the course of the further insertion of the fuel pump nozzle.

According to the invention, fuel which escapes from the pump nozzle before the actual filling process can therefore flow off into the vehicle tank through the already partially opened closure flap, with the result that undesired accumulations of fuel in the region of the filling neck are avoided. The same applies to fuel which runs subsequently after the filling process. In the course of the removal of the fuel pump nozzle from the filling neck, the closure flap is firstly still held partially opened by the mis-filling prevention device which is not yet in its closed position again, with the result that fuel which runs subsequently can also flow off into the vehicle tank. At the same time, in the closed state, the closure flap can close off the filling neck in a seal-forming fashion, with the result that undesired escaping of fuel vapors is reliably avoided.

According to one refinement, the mis-filling prevention device can be spring-preloaded into its axial position partly opening the closure flap, the spring preload of the mis-filling prevention device being lower than the spring preload of the closure flap in the closed position of the latter. The mis-filling prevention device therefore bears at all times on the closure flap if the fuel pump nozzle is pulled back from the closure flap. Therefore, the mis-filling prevention device is only moved into its home position again, axially in the direction of the insertion opening, by the closure flap which moves back into its closed position. This in turn takes place only after the fuel pump nozzle has been pulled back completely out of the mis-filling prevention device. The backward movement of the closure flap therefore takes place with a delay and the flowing off of residual fuel is improved.

As an alternative or addition to the abovementioned refinement, in its enabling position, the mis-filling prevention device engages with a contact surface behind a blocking section of the filling neck, so that, in its enabling position, the mis-filling prevention device cannot be moved out of its axial position partly opening the closure flap. As a result of the engagement behind, the mis-filling prevention device cannot move out of the axial position which keeps the closure flap partially open back into its axial home position in the direction of the insertion opening, as long as the mis-filling prevention device is still held in the enabling position by the fuel pump nozzle, for example is widened. For this time period, the mis-filling prevention device therefore holds the closure flap in its slightly open position.

Even with this refinement, the flowing off of residual fuel to the vehicle tank through the slightly opened closure flap is still made possible until the fuel pump nozzle is completely pulled out of the mis-filling prevention device. The blocking section of the filling neck can narrow conically in the direction of the insertion opening of the filling neck. This refinement brings about a uniform, non-jolting return movement of the mis-filling prevention device into its axial home position.

According to a further refinement there can be provision that the mis-filling prevention device has a slit actuating ring made of resilient material or with radial spring preload with an axis-parallel gap, and an insertion section which narrows conically in the insertion direction of the fuel pump nozzle and the narrow cross section of which is smaller than the cross section of a diesel pump nozzle and is equal to or greater than the cross section of a gasoline pump nozzle, so that the actuating ring is widened by the insertion of a diesel pump nozzle. It is then also possible that, at its end facing the vehicle tank, the actuating ring has an actuating section, the actuating section of the actuating ring acting on the closure flap, by which means the closure flap is moved from the closed to the open position when the actuating ring is widened by a diesel pump nozzle and the actuating section is displaced.

The closure flap can have a locking section which projects in the direction of the mis-filling prevention device and which, when the actuating ring is not widened, is caught between two blocking arms of the actuating ring, the blocking arms releasing the locking section as the actuating ring is widened. The conically narrowing insertion section can be formed by ribs or slats spaced apart in the circumferential direction of the actuating ring, which are spread apart as a diesel pump nozzle is inserted into the actuating ring.

In the abovementioned refinements, the mis-filling prevention device has a slit actuating ring as is known from DE 10 2004 002 994 B3. The actuating ring has a narrow cross section, that is to say a cross section of maximum narrowness in the non-widened state, which cross section is smaller than the cross section or diameter of a diesel pump nozzle, but not smaller than the cross section or diameter of a gasoline pump nozzle. This ensures that a gasoline pump nozzle does not spread apart the actuating ring so that when a gasoline pump nozzle is inserted the closure flap also cannot be moved into its open position. Mis-filling of a diesel vehicle tank with gasoline is therefore reliably avoided. In contrast, owing to its relatively large cross section or diameter a diesel pump nozzle widens the actuating ring and can move the closure flap into its open position for a filling process. In the widened state, the closure flap is enabled for opening, for example in that a locking section which is caught on the actuating ring in the non-widened state is enabled.

According to a further refinement there can be provision that, between the mis-filling prevention device and the insertion opening for the fuel pump nozzle, an additional closure flap is mounted on the filling neck such that it can be pivoted between a closed position closing the filling neck and an open position opening the filling neck, the additional closure flap being preloaded into the closed position by spring preload and being able to be pivoted from the closed position into the open position by a fuel pump nozzle. In this context it is also possible that, as the additional closure flap is pivoted into its open position, the mis-filling prevention device is forced against the closure flap in the axial direction by the additional closure flap, the closure flap being moved into a partly open position. The abovementioned refinements with a further closure flap arranged between the insertion opening of the mis-filling prevention device are applied, in particular, in the case of capless filling necks.

Figure 2:
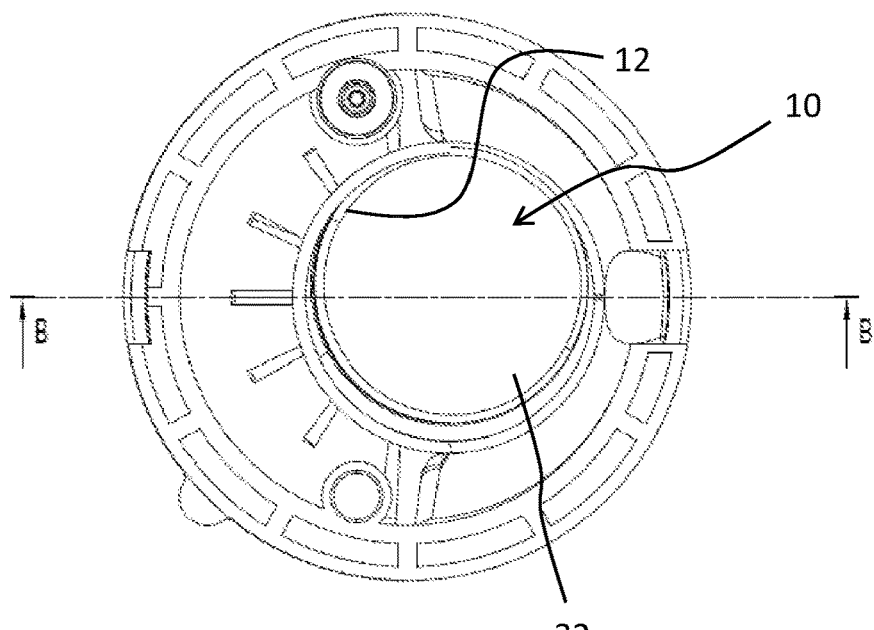
Figure 3:
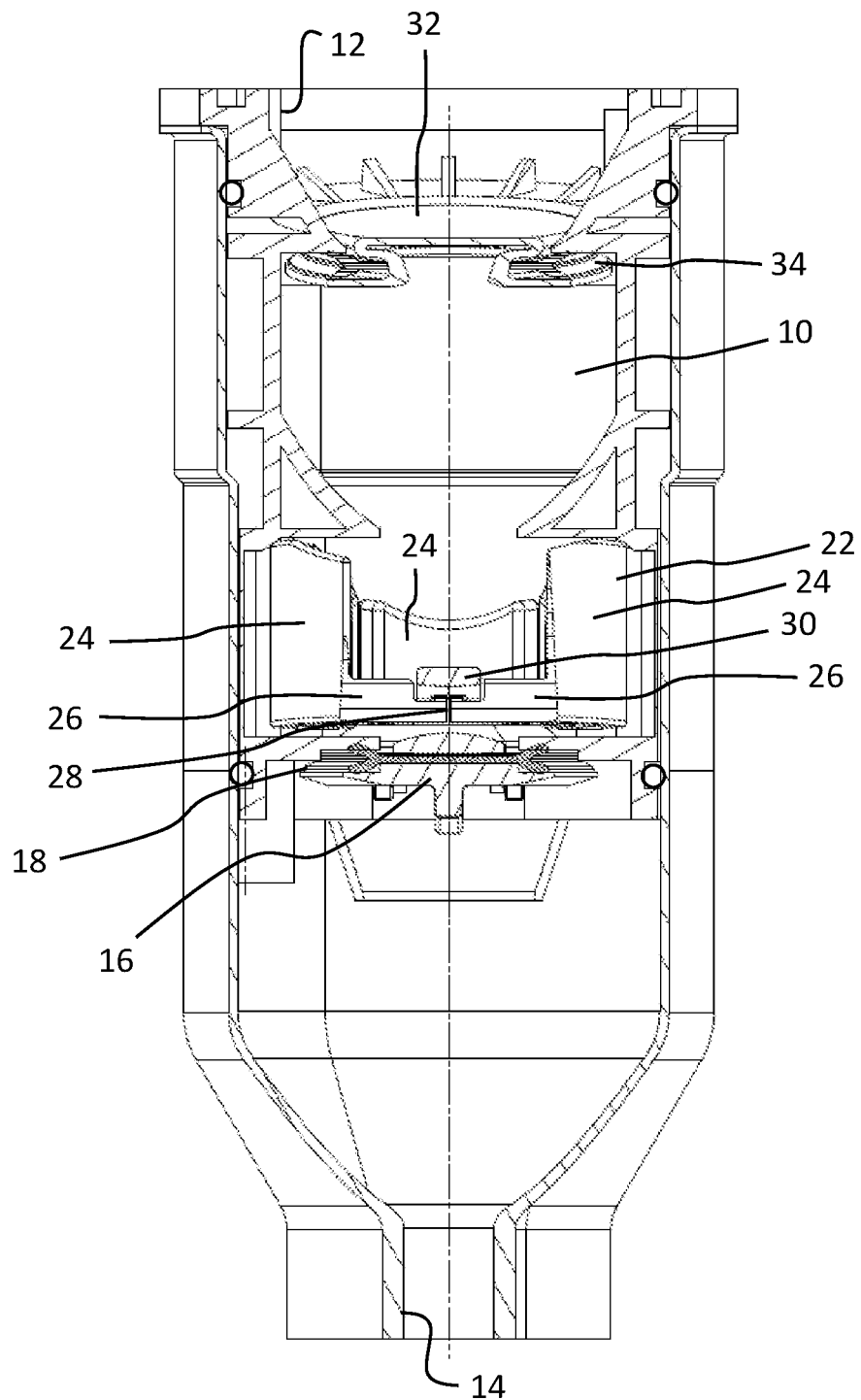
Figure 4:
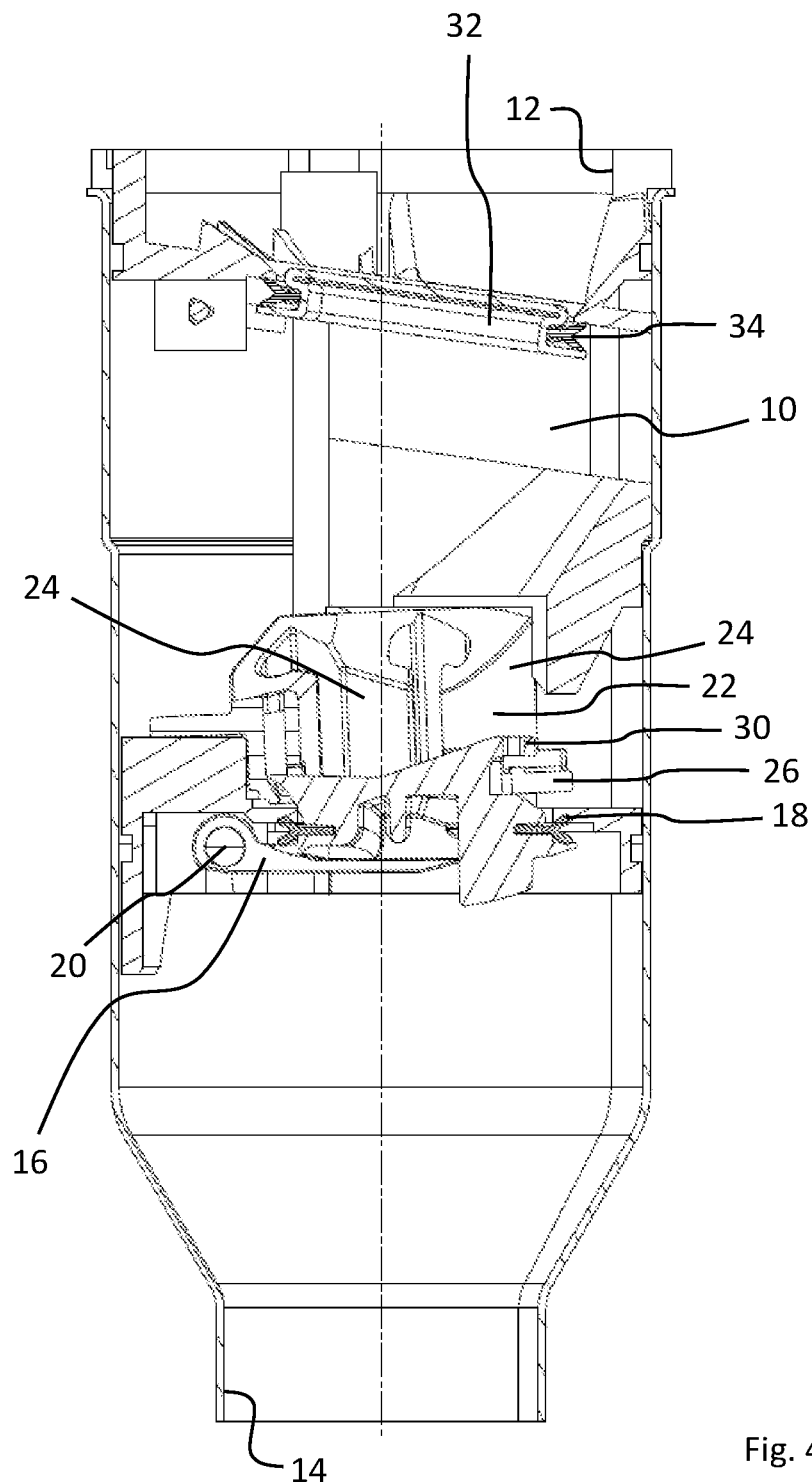
Figure 5:
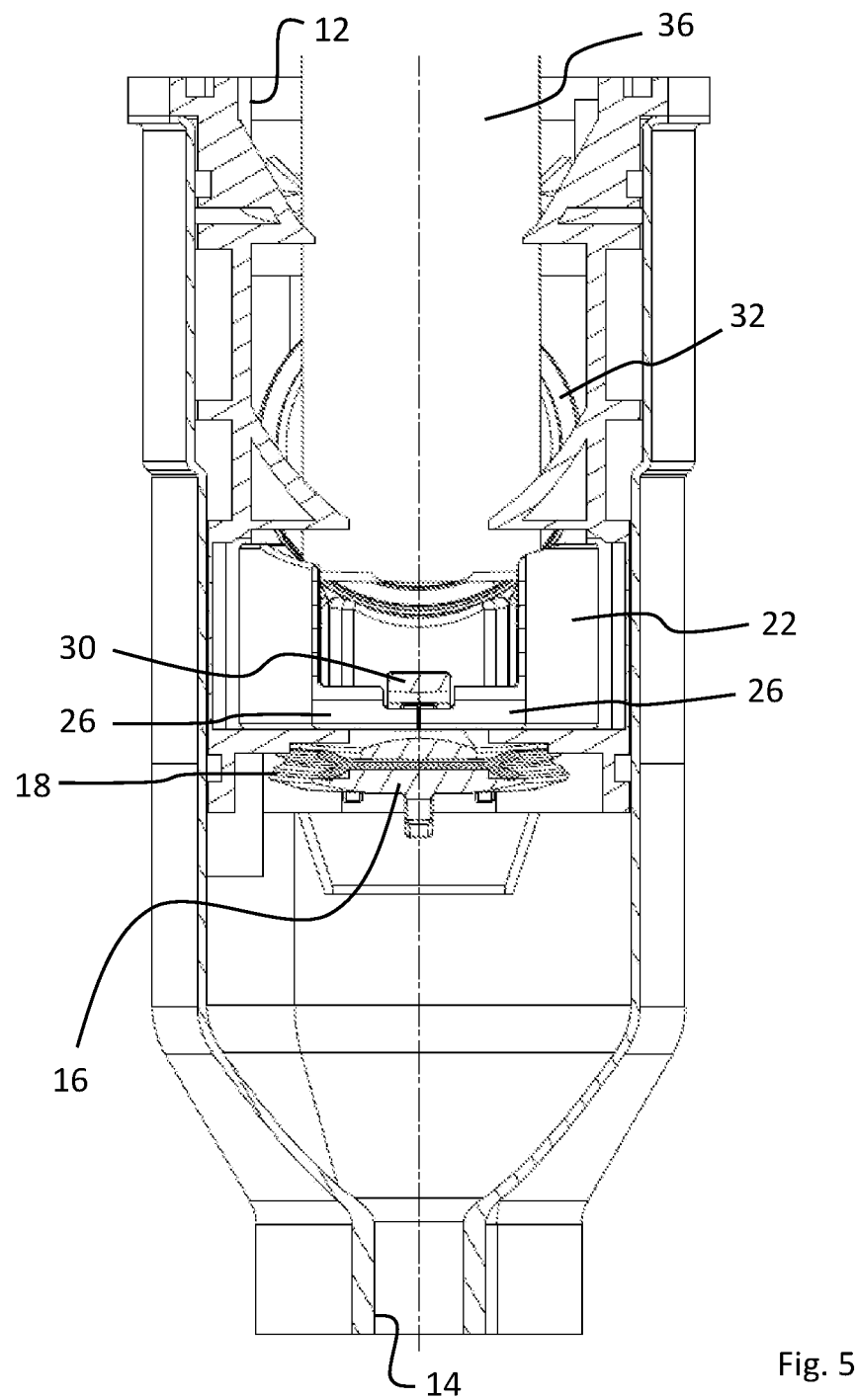
Figure 6:
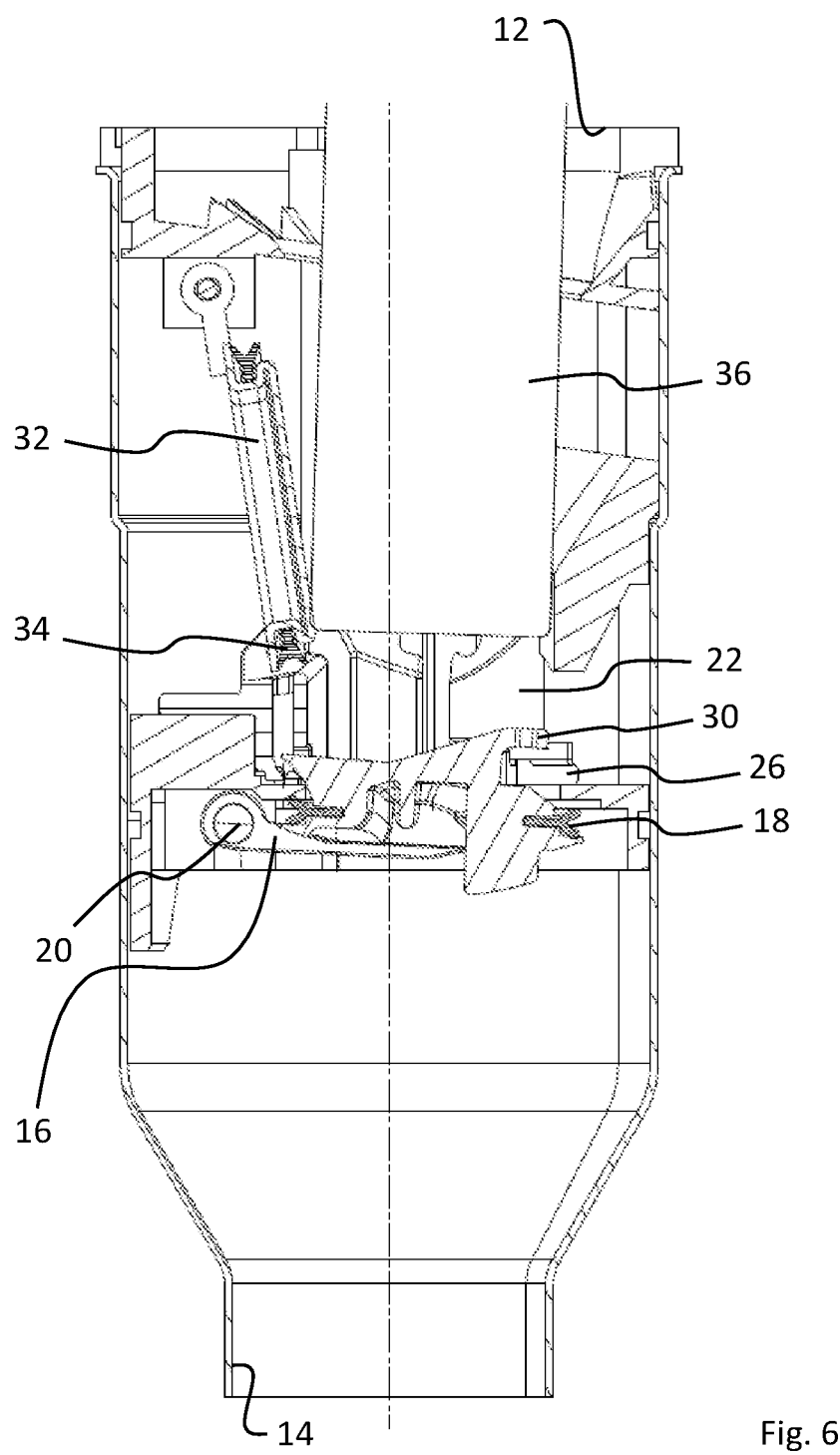
Figure 7:
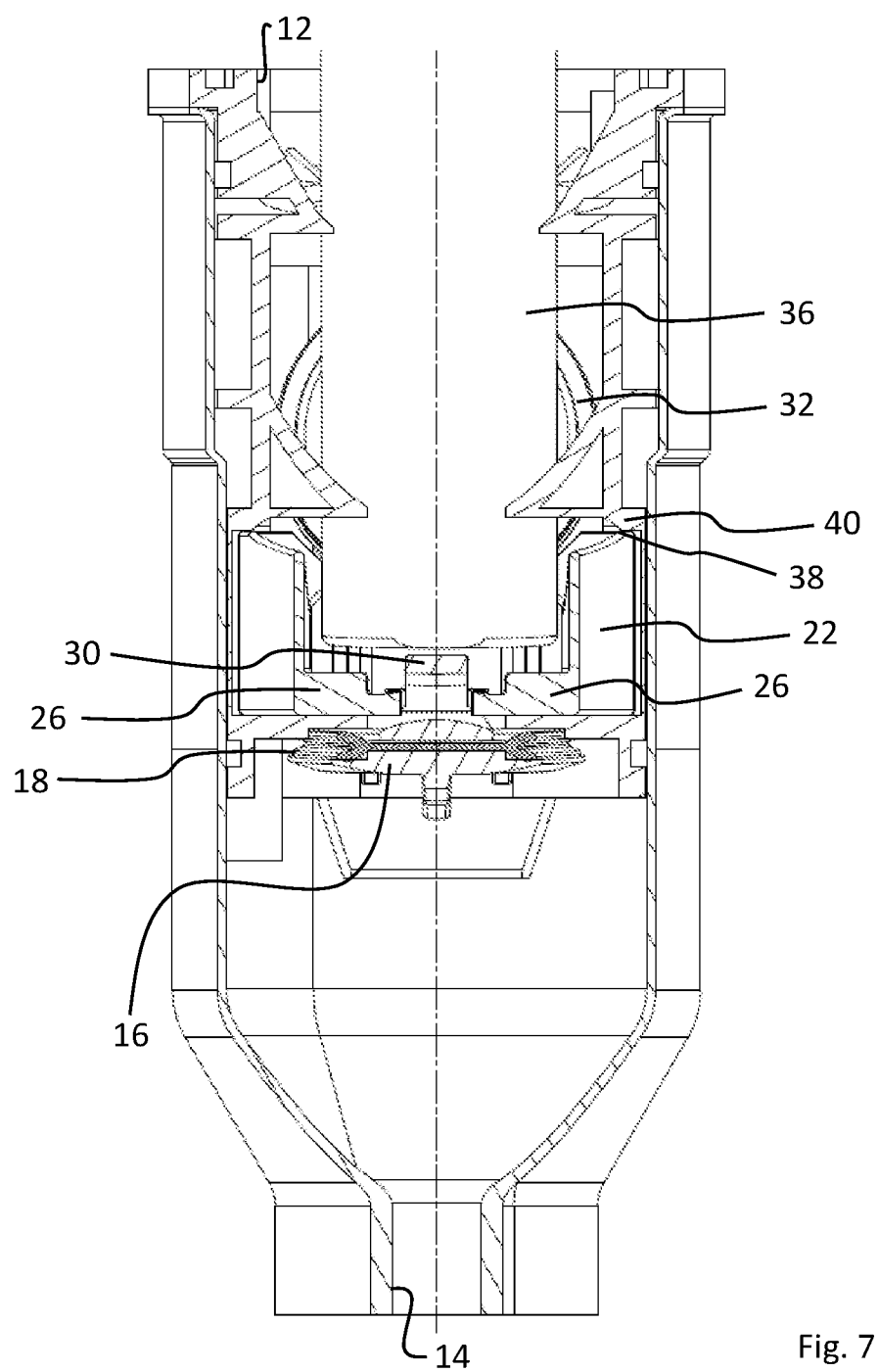
Figure 8:
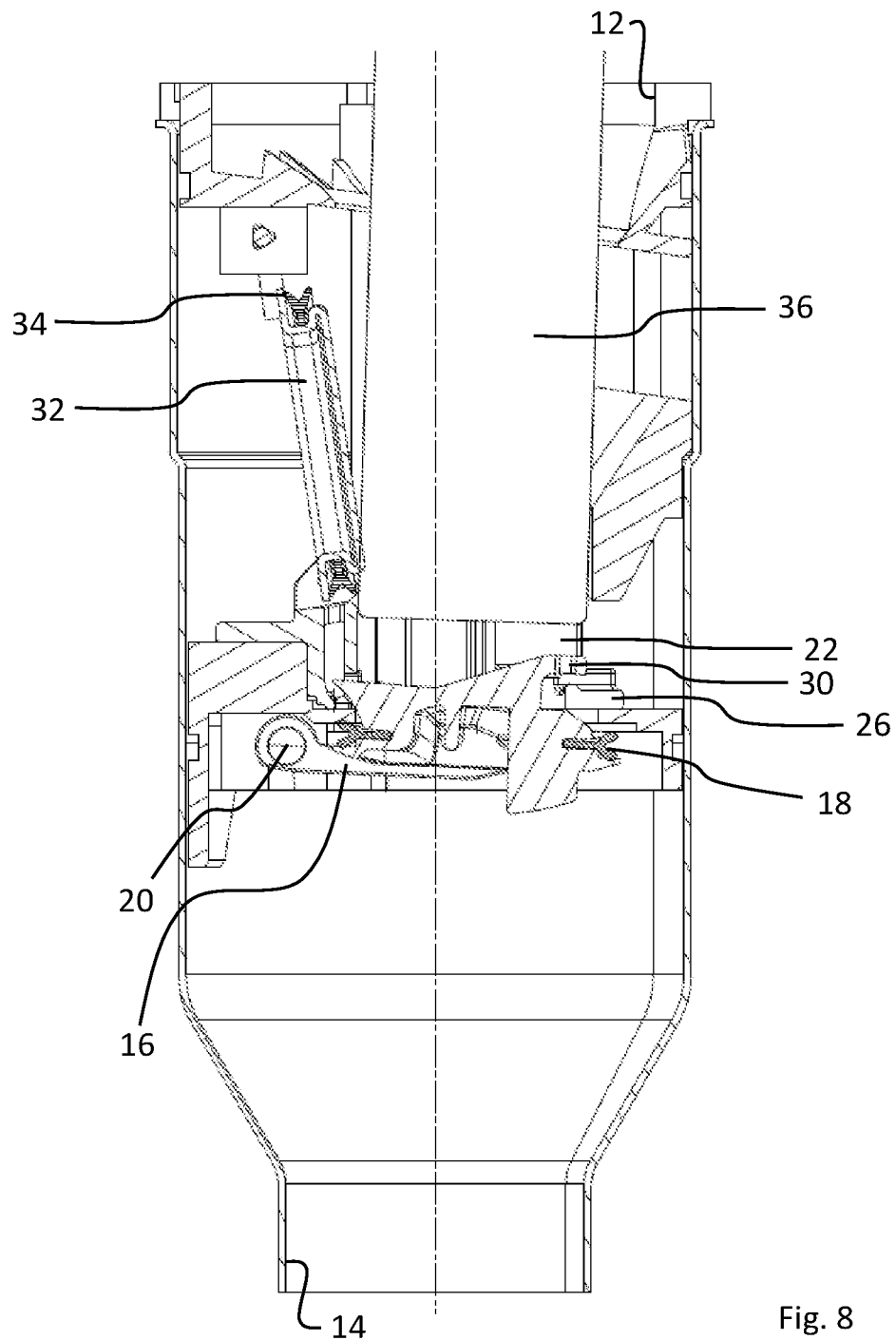
Figure 9:
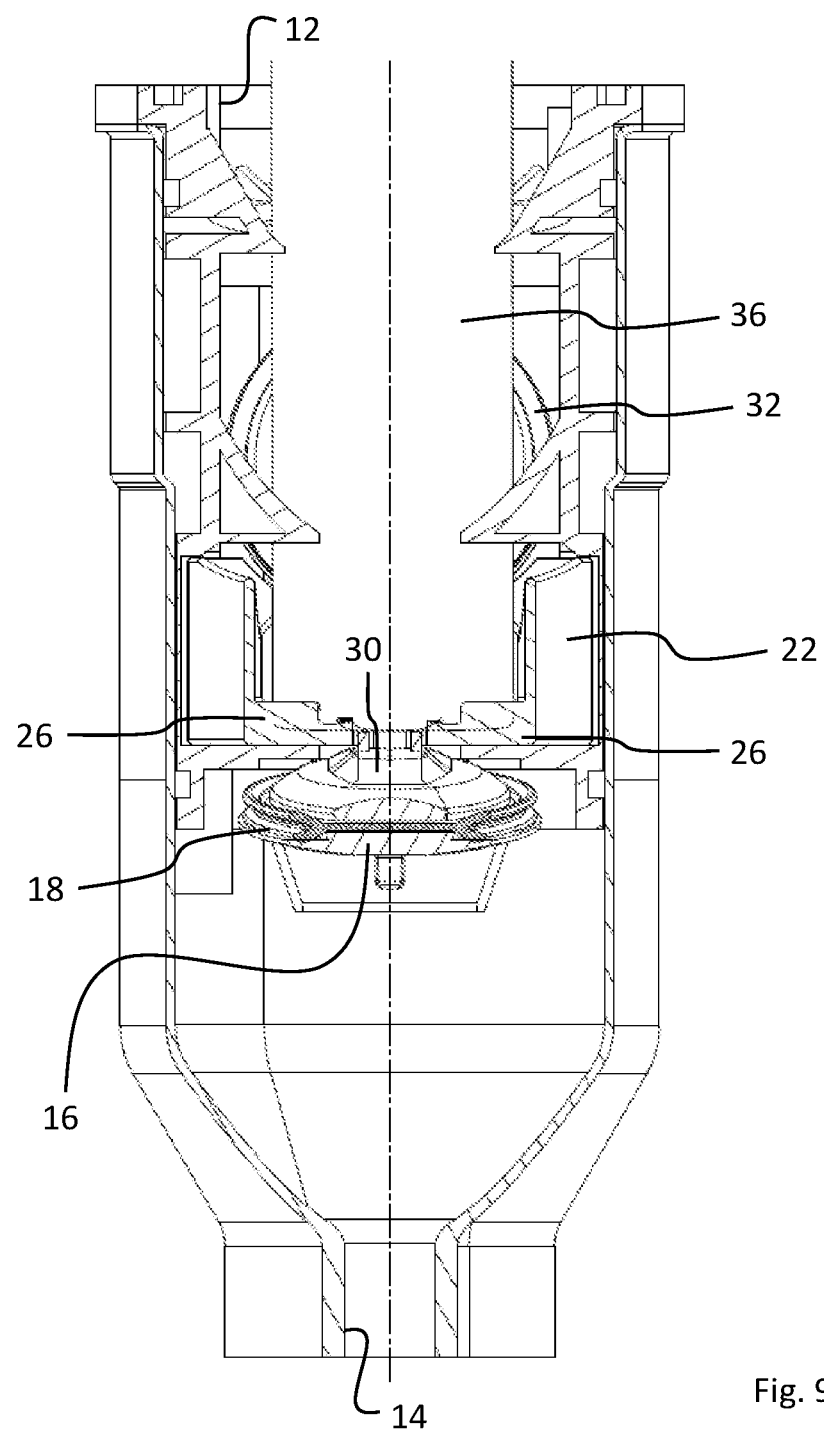
Figure 10:
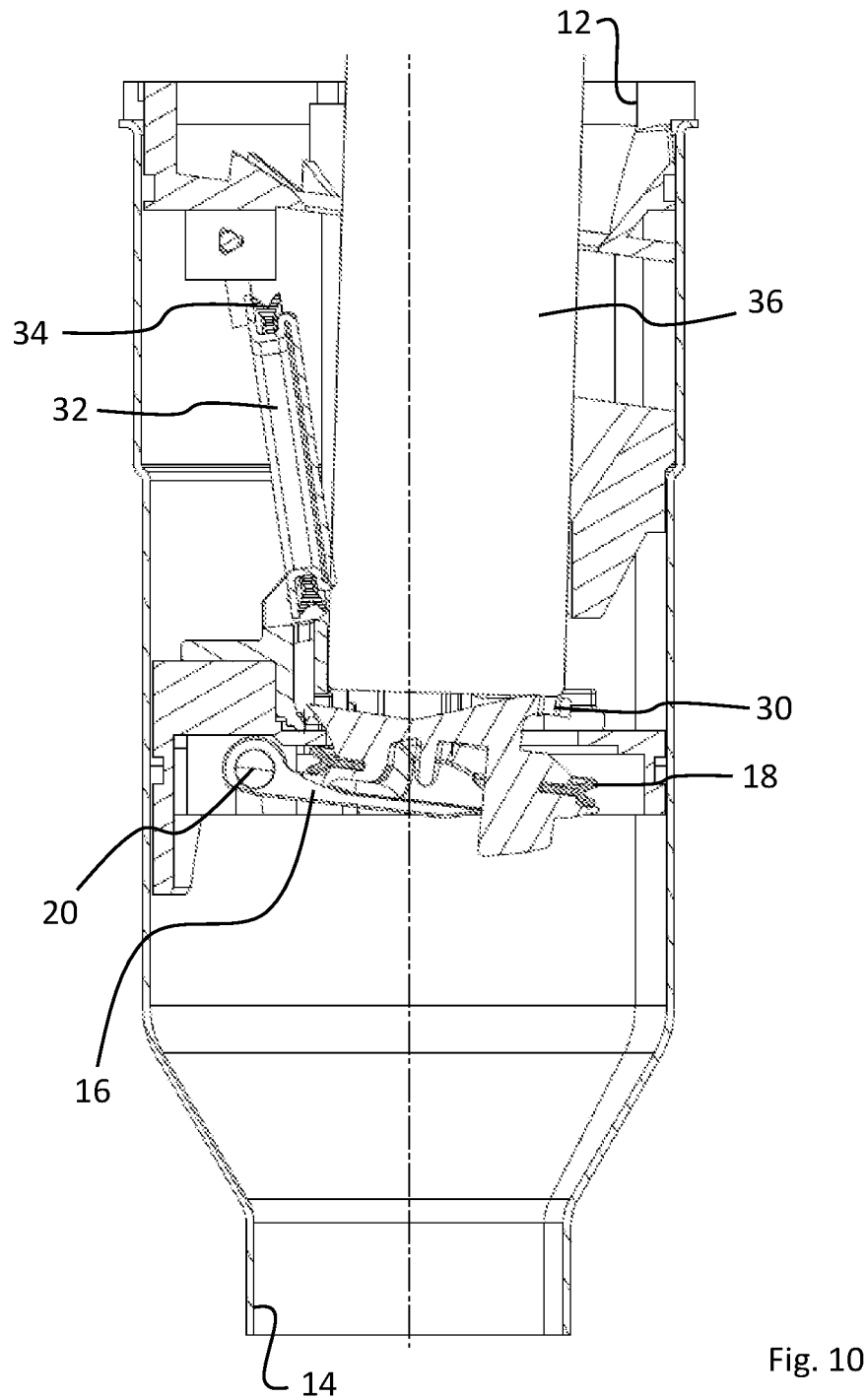
Figure 11:
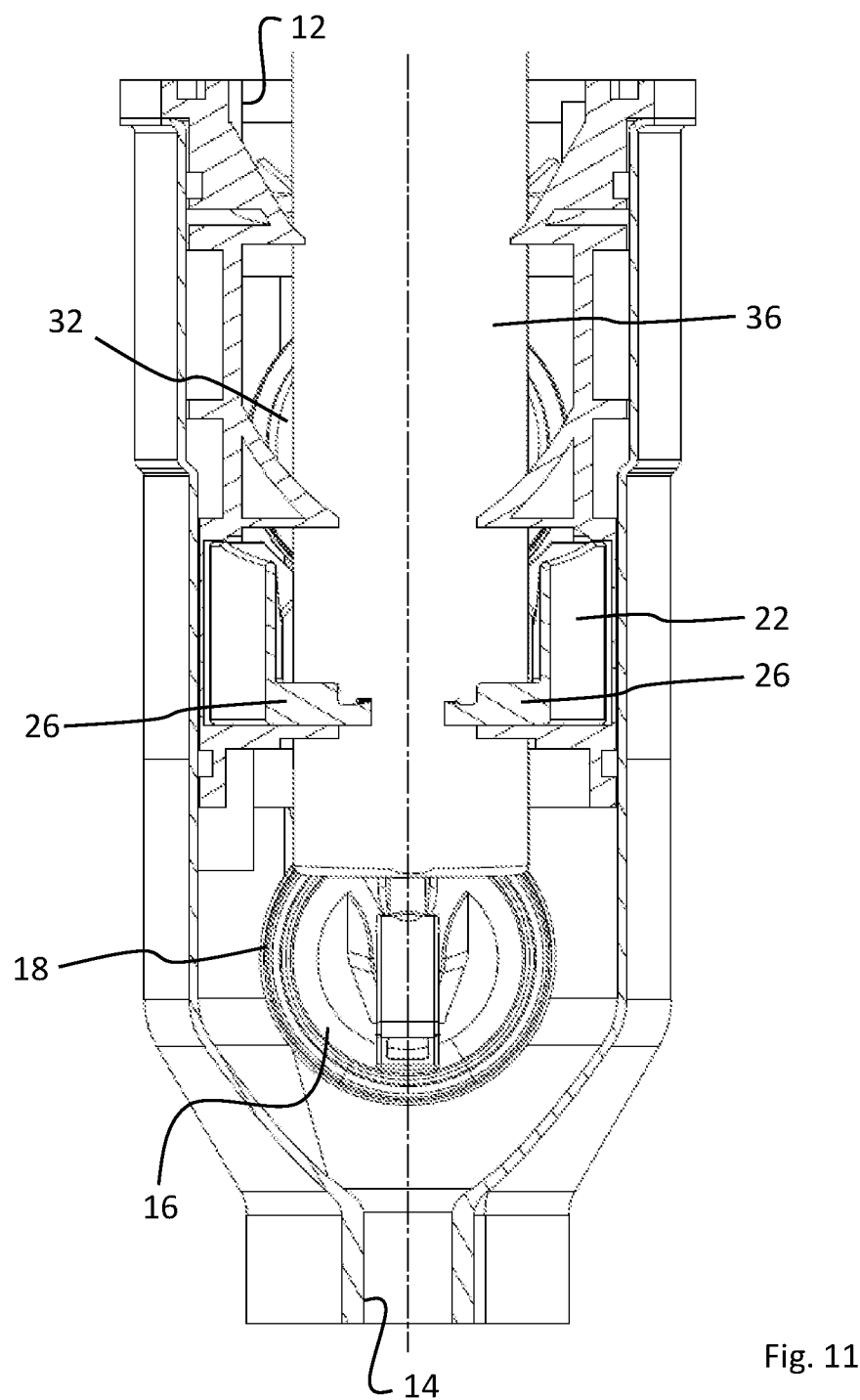
Figure 12:
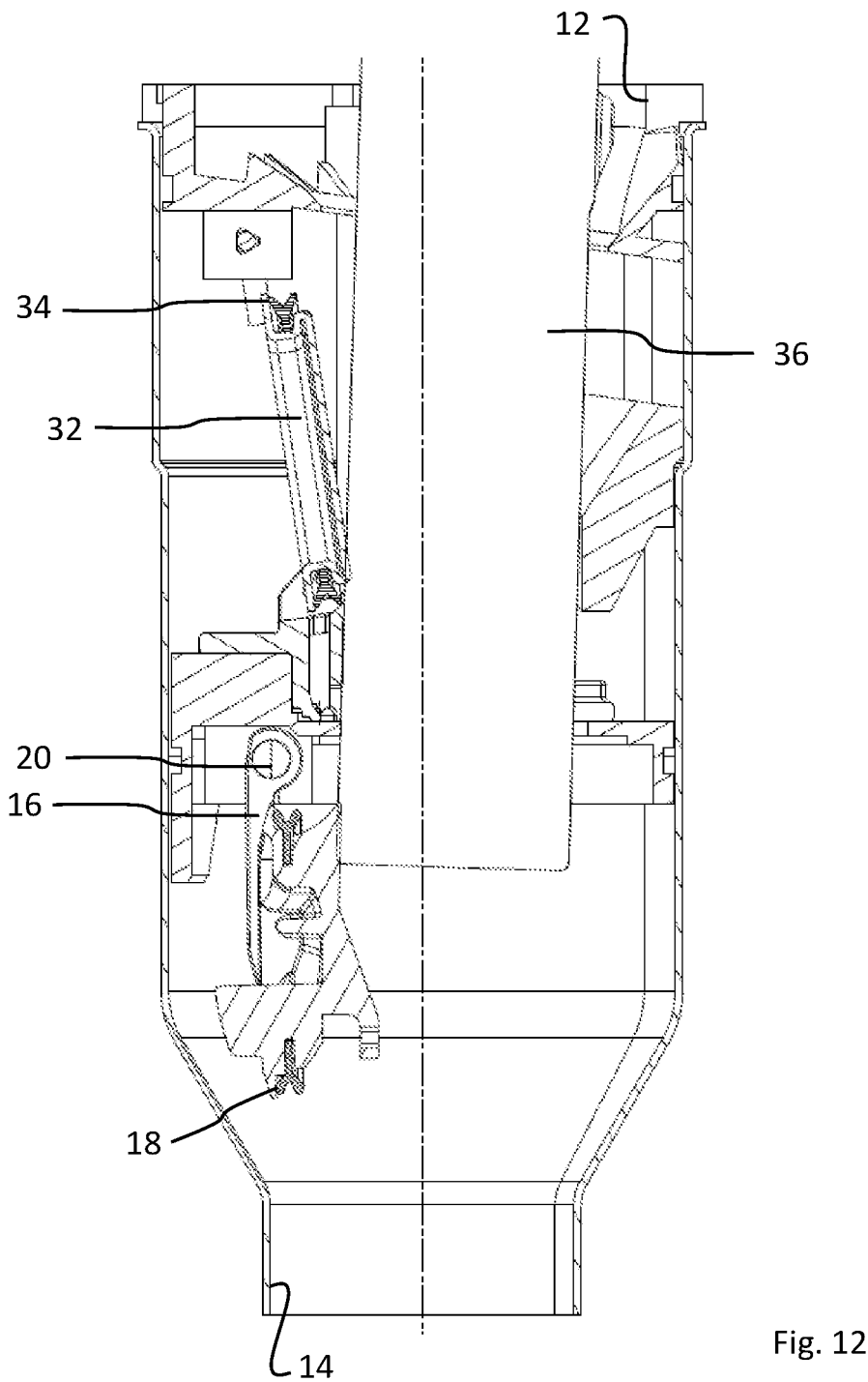

An exemplary embodiment of the invention will be explained in more detail below with reference to figures. In the drawing, in each case in a schematic form:

FIG. 1 shows a filling neck according to the invention in a first view from above, FIG. 2 shows the filling neck from FIG. 1 in a second view from above, FIG. 3 shows the filling neck from FIGS. 1 and 2 in a sectional view along the line A-A in FIG. 1 in a first operating state, FIG. 4 shows the filling neck from FIGS. 1 and 2 in a sectional view along the line B-B in FIG. 2 in the operating state from FIG. 3, FIG. 5 shows the filling neck from FIGS. 1 and 2 in a sectional view along the line A-A in FIG. 1 in a second operating state, FIG. 6 shows the filling neck from FIGS. 1 and 2 in a sectional view along the line B-B in FIG. 2 in the operating state in FIG. 5, FIG. 7 shows the filling neck from FIGS. 1 and 2 in a sectional view along the line A-A in FIG. 1 in a third operating state, FIG. 8 shows the filling neck from FIGS. 1 and 2 in a sectional view along the line B-B in FIG. 2 in the operating state from FIG. 7, FIG. 9 shows the filling neck from FIGS. 1 and 2 in a sectional view along the line A-A in FIG. 1 in a fourth operating state, FIG. 10 shows the filling neck from FIGS. 1 and 2 in a sectional view along the line B-B in FIG. 2 in the operating state from FIG. 9, FIG. 11 shows the filling neck from FIGS. 1 and 2 in a sectional view along the line A-A in FIG. 1 in a fifth operating state, and FIG. 12 shows the filling neck from FIGS. 1 and 2 in a sectional view along the line B-B in FIG. 2 in the operating state from FIG. 11.

Unless stated otherwise, in the figures identical reference symbols denote identical objects. The filling neck according to the invention forms a tubular section 10 with an insertion opening 12, approximately circular in cross section, for a fuel pump nozzle, in the present example for a diesel pump nozzle. At the end opposite the insertion opening 12, the filling neck has an outlet opening 14 which, in the mounted state, is connected to the vehicle tank, for example via a filling pipe (not illustrated).

A closure flap 16 is mounted on an inner wall of the filling neck such that can be pivoted between a closed position closing off the filling neck in a seal-forming fashion and an open position opening the filling neck. For the seal, the closure flap 16 has a circumferential sealing lip 18 which is V-shaped in cross section. The pivoting axis of the closure flap 16 is illustrated with the reference symbol 20. Furthermore, a mis-filling prevention device 22 is arranged in the filling neck, between the insertion opening 12 and the closure flap 16. The mis-filling prevention device 22 comprises a slit actuating ring made of resilient material or with radial spring preload. The actuating ring is formed from a plurality of slats arranged spaced apart from one another over the circumference of the actuating ring and shown by way of example with the reference symbol 24 in FIGS. 3 and 4. The actuating ring also has two blocking arms 26 which form, for example in the non-widened state of the actuating ring (shown in FIG. 3), an axis-parallel gap 28 between their free ends. In the state of the actuating ring shown in FIGS. 3 and 4, a locking section 30 of the closure flap 16 is caught between the blocking arms 26. The actuating ring forms, in its non-widened state shown in FIGS. 3 and 4, a narrow cross section which is smaller than the cross section of a diesel pump nozzle but larger than or equal to the cross section of a gasoline pump nozzle. The actuating ring, in particular the slats 24, can be spread apart by inserting a diesel pump nozzle, as will be explained in more detail below.

Furthermore, an additional closure flap 32 is mounted between the insertion opening 12 and the mis-filling prevention device 22 such that can be pivoted between a closed position closing the filling neck and an open position opening the filling neck. The additional closure flap 32 also has a circumferential sealing lip 34 with a V-shaped cross section and closes off the filling neck in a seal-forming fashion in the closed state shown in FIGS. 3 and 4. The filling neck shown in the example is a capless filling neck, that is say without an external closure cap.

The closure flap 16 is preloaded into its closed position shown in FIGS. 3 and 4 by spring preload. The additional closure flap 32 is also preloaded, by spring preload, into its closed position shown in FIGS. 3 and 4. The mis-filling prevention device 22 is mounted in the filling neck so as to be axially movable between two stops. The mis-filling prevention device 22 can also be spring-preloaded by spring preload into an axial position in which it is displaced with respect to the axial position shown in FIGS. 3 and 4, in the direction of the closure flap 16. Since the spring preload of the mis-filling prevention device 22 is, however, smaller than the spring preload of the closure flap 16, the mis-filling prevention device 22 is forced axially upward in the home state shown in FIGS. 3 and 4, by the closure flap 16. However, it is also possible that, for example, the mis-filling prevention device 22 is configured without spring preload at that time. It is then forced only by the closure flap 16 into the axial position in which it is displaced with respect to the axial position shown in FIGS. 3 and 4, in the direction of the closure flap 16.

The function of the filling neck according to the invention will now be explained in more detail with reference to FIGS. 5 to 12. In this context, FIGS. 5 and 6, FIGS. 7 and 8, FIGS. 9 and 10 and FIGS. 11 and 12 show how a diesel pump nozzle (shown with the reference symbol 36) for filling a vehicle tank connected to the filling neck is successively inserted into the filling neck. By inserting the diesel pump nozzle 36 through the insertion opening 12, the additional closure flap 32 is firstly pivoted against its spring preload into an open position, as can be seen in FIGS. 5 and 6. As is also apparent in FIGS. 5 and 6, the diesel pump nozzle 36 which impinges on the mis-filling prevention device 22, in particular the segments 24 of the actuating ring, forces the mis-filling prevention device 22 axially in the direction of the closure flap 16, against the spring preload of the closure flap 16, the closure flap 16 being moved into a slightly open position. As mentioned, the axial movability of the mis-filling prevention device 22 is bounded in both directions by corresponding stops. FIGS. 5 and 6 show the lower stop of the axial movability being reached. The partial opening of the closure flap 16 ensures that fuel which has already escaped before the actual filling process can run off into the vehicle tank and does not collect undesirably in the filling neck.

If the diesel pump nozzle 36 is inserted further into the filling neck, as can be seen in FIGS. 7 and 8, the actuating ring of the mis-filling prevention device 22 widens, wherein, in particular, the blocking arms 26 are distanced from one another by widening the axial gap, and the locking section 30 of the closure flap 16 is no longer caught by the blocking arms 26. In particular in FIG. 7 it is also apparent that the mis-filling prevention device 22, here the outer segments 24, each engage with a contact surface 38 behind a blocking section 40 of the filling neck. In this spread-apart state, the mis-filling prevention device 22 therefore cannot move axially back into its home position, upward in FIG. 7. Through further insertion of the diesel pump nozzle 36 the latter comes into contact with its free end with the now enabled closure flap 16 and forces it out of the closed position into the open position as shown in FIGS. 9 and 10 and 11 and 12. In the completely open state of the closure flap 16 shown in FIGS. 11 and 12, fuel can be conducted into the vehicle tank via the diesel pump nozzle 36.

When the diesel pump nozzle 36 is pulled out, the movement sequence occurs essentially in the reverse direction. The engagement behind the blocking section 40 by the mis-filling prevention device 22 with its contact surface 38 ensures that the mis-filling prevention device 22 remains in its position in which it is axially displaced in the direction of the closure flap 16 until the diesel pump nozzle 36 is completely pulled out of the mis-filling prevention device 22, and the actuating ring is correspondingly no longer widened. This ensures that fuel which runs subsequently in the course of the pulling back of the diesel pump nozzle 36 can still run off into the vehicle tank and cannot collect undesirably in the filling neck.

The invention claimed is:

1. A filling neck for putting fuel into a vehicle tank, comprising
   a closure flap (16) which is pivotably mounted on the filling neck so as to be pivotable between a closed position closing the filling neck and an open position opening the filling neck, wherein the closure flap is spring preloaded into the closed position by spring pretension, wherein insertion of a fuel pump nozzle causes pivot of the closure flap from the closed position into the open position, a mis-filling prevention device (22), which is arranged in the filling neck between the closure flap (16) and an insertion opening (12) for the fuel pump nozzle, wherein the mis-filling prevention device has a closed position and an enabling position, wherein, in the closed position, the mis-filling prevention device prevents the closure flap (16) from being pivoted into the open position by the fuel pump nozzle, wherein, in the enabling position, the mis-filling prevention device permits the fuel pump nozzle to directly engage and move the closure flap (16) in order to pivot the closure flap (16) into the open position by the fuel pump nozzle, wherein the mis-filling prevention device (22) is mounted in the filling neck with play in an axial direction in such a way that the mis-filling prevention device (22) is first forced against the closure flap (16) in the axial direction by the fuel pump nozzle as the fuel pump nozzle is inserted into the filling neck causing the closure flap (16) to be moved into a partly open position before the mis-filling prevention device is moved into the enabling position, and, during subsequent further insertion of the fuel pump nozzle, the mis-filling prevention device (22) is moved by the fuel pump nozzle into the enabling position.

2. The filling neck as claimed in claim 1, wherein the mis-filling prevention device (22) is spring-preloaded axially toward and into contact with the closure flap (16), the spring preload of the mis-filling prevention device (22) being lower than the spring preload of the closure flap (16) in the closed position of the closure flap.

3. The filling neck as claimed in claim 1, wherein, in the enabling position, the mis-filling prevention device (22) expands radially outwardly and engages with a contact surface (38) behind a blocking section (40) of the filling neck, so that, in the enabling position, the mis-filling prevention device (22) cannot be moved out of its axial position partly opening the closure flap (16).

4. The filling neck as claimed in claim 3, characterized in that the blocking section (40) of the filling neck narrows conically in the direction of the insertion opening (12) of the filling neck.

5. The filling neck as claimed in claim 1, wherein the fuel pump nozzle is a diesel pump nozzle (36), wherein the mis-filling prevention device (22) has a slit actuating ring made of resilient material or with radial spring preload with an axially parallel slot (28), and an insertion section which narrows conically in the insertion direction of the diesel pump nozzle and the narrow cross section of which is smaller than the cross section of the diesel pump nozzle (36) and is equal to or greater than the cross section of a gasoline nozzle, so that the actuating ring is widened by the insertion of the diesel pump nozzle (36).

6. The filling neck as claimed in claim 5, wherein, at its end facing the vehicle tank, the actuating ring has an actuating section, the actuating section of the actuating ring acting on the closure flap (16), by which means the closure flap (16) is moved from the closed to the open position when the actuating ring is widened by the diesel pump nozzle (36) and the actuating section is displaced.

7. The filling neck as claimed in claim 5, wherein the closure flap (16) has a locking section (30) which projects in the direction of the mis-filling prevention device (22) and which, when the actuating ring is not widened, is caught between two blocking arms (26) of the actuating ring, the blocking arms (26) releasing the locking section (30) as the actuating ring is widened.

8. The filling neck as claimed in claim 5, wherein the conically narrowing insertion section is formed by ribs or slats (24) spaced apart in the circumferential direction of the actuating ring, which are spread apart as a diesel pump nozzle (36) is inserted into the actuating ring.

9. The filling neck as claimed in claim 1, wherein, between the mis-filling prevention device (22) and the insertion opening (12) for the fuel pump nozzle, an additional closure flap (32) is pivotably mounted on the filling neck for pivot between a closed position closing the filling neck and an open position opening the filling neck, the additional closure flap (32) being preloaded into the closed position by spring preload and being pivotable from the closed position into the open position by the fuel pump nozzle.

10. The filling neck as claimed in claim 9, wherein, as the additional closure flap (32) is pivoted into its open position, the mis-filling prevention device (22) is forced against the closure flap (16) in the axial direction by the additional closure flap (32), the closure flap (16) being moved into the partly open position.

11. A filling neck for putting fuel into a vehicle tank, comprising a closure flap pivotably mounted on the filling neck pivoted for pivotable movement between a closed position closing the filling neck and a fully open position opening the filling neck, wherein the closure flap is spring preloaded into the closed position by spring pretension and is pivotable from the closed position into the fully open position by a fuel pump nozzle inserted into the filling neck, a mis-filling prevention device arranged in the filling neck between the closure flap and an insertion opening for the fuel pump nozzle, the mis-filling prevention device having a closed position that prevents the closure flap from being pivoted into the fully open position by the fuel pump nozzle, the mis-filling prevention device movable by the fuel pump nozzle from its closed position into an enabling position permitting the fuel pump nozzle to move axially through the mis-filling prevention device to engage the closure flap in order to pivot the closure flap into the fully open position, wherein the mis-filling prevention device is mounted in the filling neck with play in an axial direction so that the mis-filling prevention device is first forced against the closure flap in the axial direction by the fuel pump nozzle as the fuel pump nozzle is inserted into the filling neck causing the closure flap to be moved into a partly open position before the mis-filling prevention device is moved into the enabling position, and, during subsequent further insertion of the fuel pump nozzle, the mis-filling prevention device is moved into the enabling position by a fuel pump nozzle.

12. The filling neck as claimed in claim 11, wherein the mis-filling prevention device is spring-preloaded toward an axial position corresponding to the partly open position of the closure flap, a spring preload force of the mis-filling prevention device being lower than a spring preload force of the closure flap when the closure flap is in the closed position.

13. The filling neck as claimed in claim 12, wherein, in the enabling position, the mis-filling prevention device engages with a contact surface behind a blocking section of the filling neck, so that, in the enabling position, the mis-filling prevention device cannot be moved out of the axial position partly opening the closure flap.

14. The filling neck as claimed in claim 13, wherein the blocking section of the filling neck narrows conically in a direction of the insertion opening of the filling neck.

15. The filling neck as claimed in claim 11, wherein the fuel pump nozzle is a diesel pump nozzle, wherein the mis-filling prevention device includes a slit actuating ring made of resilient material or with radial spring preload with an axially parallel slot, and an insertion section which narrows conically in an insertion direction of the diesel pump nozzle and having a narrow cross section that is smaller than a cross section of the diesel pump nozzle and is equal to or greater than the cross section of a gasoline nozzle, so that the actuating ring is widened by the insertion of the diesel pump nozzle.

16. A filling neck for putting fuel into a vehicle tank, comprising
- a closure flap pivotably mounted on the filling neck for pivotable movement between a closed position closing the filling neck and a fully open position opening the filling neck, wherein the closure flap is spring preloaded into the closed position by spring pretension and is pivotable from the closed position into the fully open position by a fuel pump nozzle inserted into the filling neck;
- a mis-filling prevention device arranged in the filling neck between the closure flap and an insertion opening for the fuel pump nozzle, the mis-filling prevention device having a closed position in which a portion of the mis-filling prevention device interacts with a portion of the closure flap to block the closure flap from being pivoted into the fully open position by the fuel pump nozzle, the mis-filling prevention device movable by the fuel pump nozzle from its closed position into an enabling position in which the portion of the mis-filling prevention device no longer interacts with the portion of the closure flap to block the closure flap from being pivoted into the fully open position by movement of the fuel pump nozzle axially through the mis-filing prevention device;

wherein the mis-filling prevention device is mounted in the filling neck with play in an axial direction so that the mis-filling prevention device is first forced against the closure flap in the axial direction by the fuel pump nozzle as the fuel pump nozzle is inserted into the filling neck causing the closure flap to be moved into a partly open position before the mis-filling prevention device is moved into the enabling position, and, during subsequent further insertion of the fuel pump nozzle, the mis-filling prevention device is moved into the enabling position by the fuel pump nozzle.

* * * * *